United States Patent Office 2,995,326
Patented Aug. 8, 1961

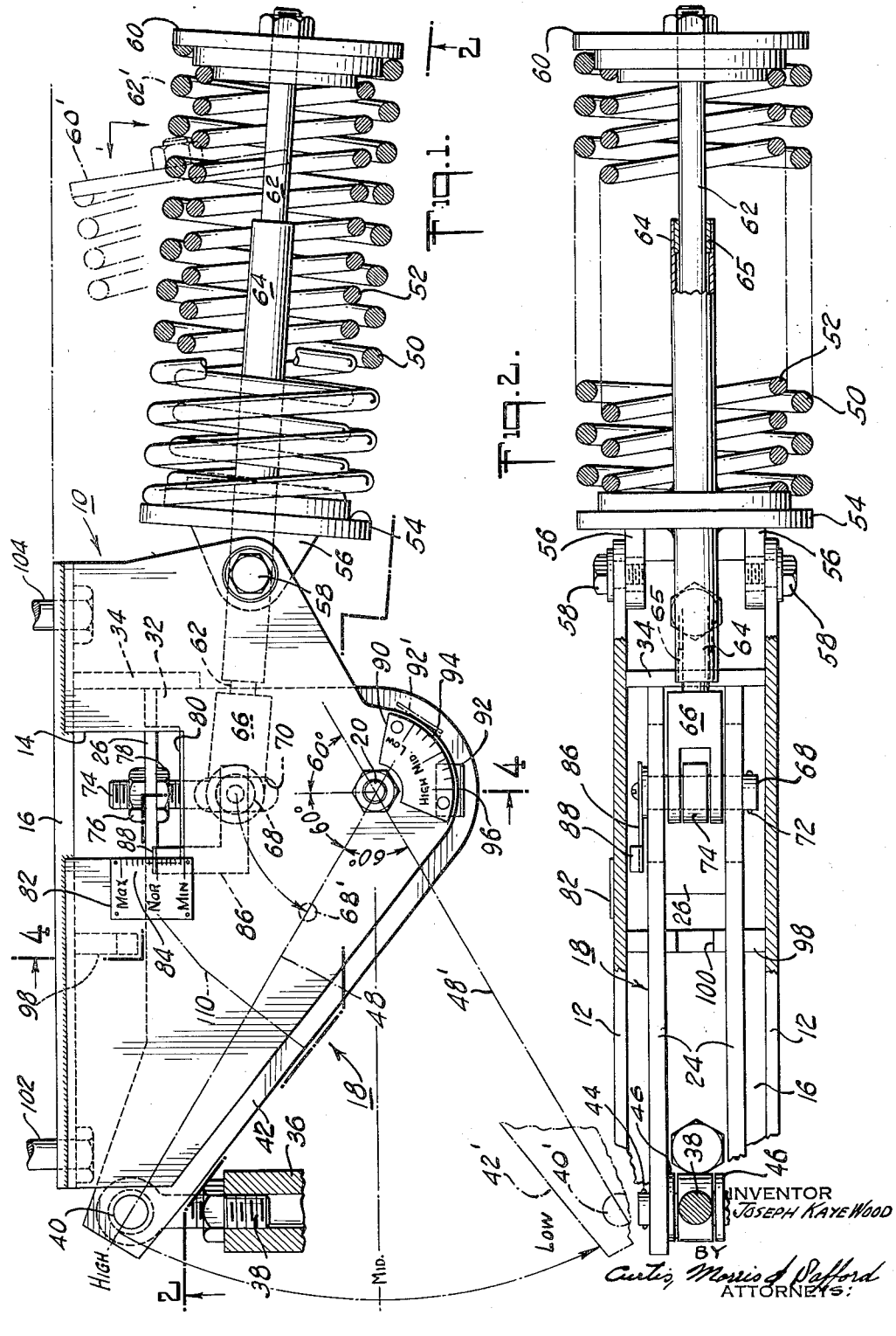

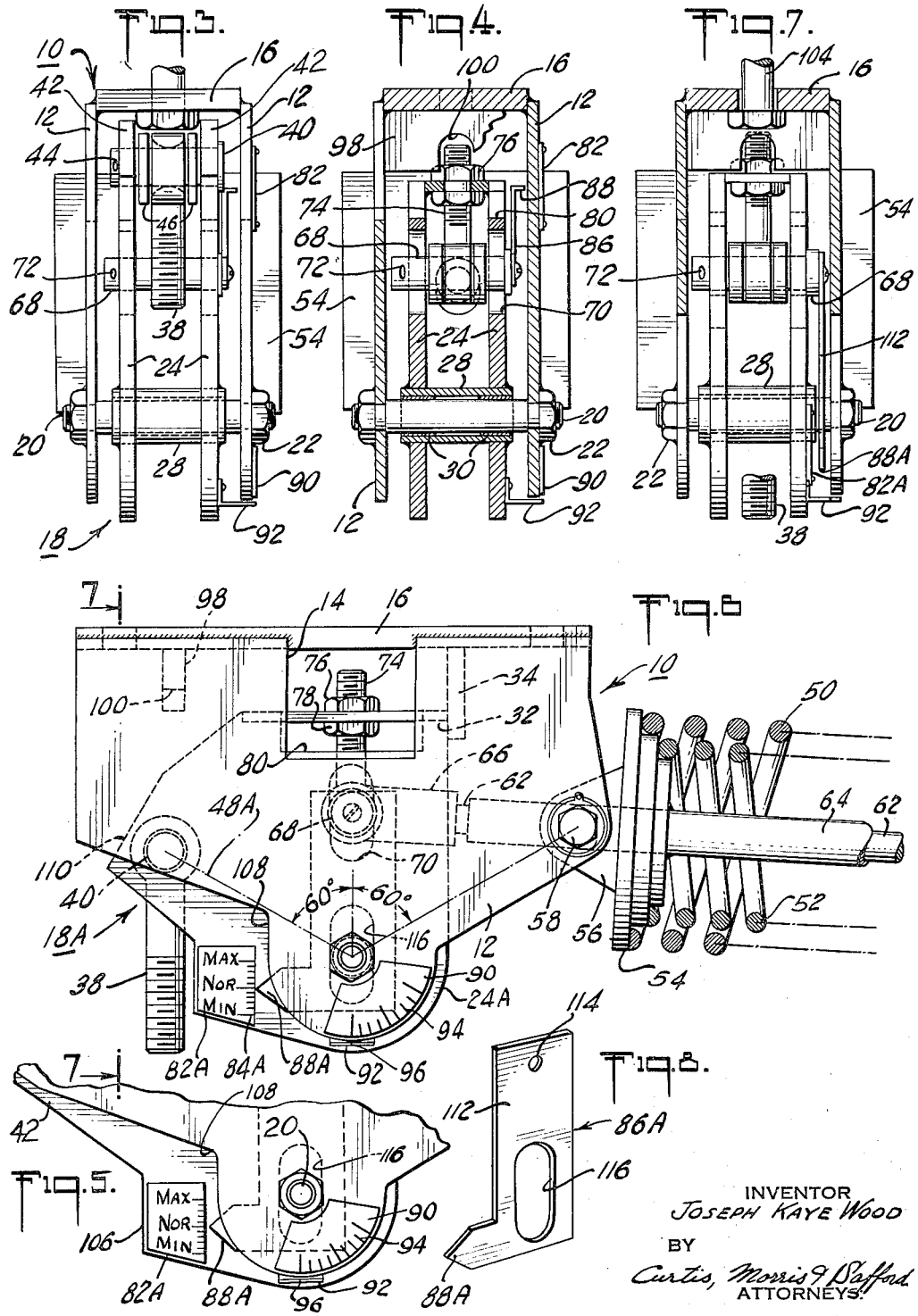

2,995,326
COMPACT ADJUSTABLE SPRING SUPPORT
Joseph Kaye Wood, Stamford, Conn., assignor to General Spring Corporation, New York, N.Y.
Filed June 19, 1957, Ser. No. 666,705
6 Claims. (Cl. 248—54)

This invention relates to spring supports of the general type for providing a substantially constant supporting force to loads, such as installed piping, which are movable with changes in temperature or other conditions. More particularly, the present invention relates to compact adjustable spring supports having reduced headroom and clearance space requirements and enabling easy adjustment of load capacity and providing a nearly constant supporting force for the movable load over an extended range of travel.

The present invention provides a constant support spring hanger for supporting movable loads such as piping and the like having at least one main spring, a lever carried by a main pivot and being coupled to the main spring for transmitting the force of the main spring to the movable load carried by the support. The supported load is connected to a load pivot point on the lever spaced out from the main pivot, and the spring is coupled to the lever by a spring pivot which is also spaced out from the main pivot and which is adjustable in position along a guideway toward and away from the main pivot for the purpose of adjusting the load capacity of the hanger. This spring pivot is readily adjusted by swinging the lever about the main pivot to its uppermost position wherein a window in the frame provides access to the adjusting mechanism. The load-capacity adjustment mechanism is positioned on the free upper end of the spring lever which location is advantageous in reducing the over-all headroom requirement of the hanger.

In the constant support hangers described herein as illustrative embodiments of the present invention the load capacity adjustment is conveniently indicated by means of a movable pointer which is associated with the spring pivot and moves in accordance with the load capacity adjustment. In certain embodiments of the invention, this load capacity adjustment indicator extends down along one side of the lever to the bottom of the hanger so that its indicated value can be read conveniently from a position to one side of the hanger and from beneath the hanger.

Among the many advantages of the illustrative embodiments of the present invention are those resulting from the fact that these hangers are adapted to accommodate load travel up and down over a distance as great as 12 inches, and nevertheless, the hangers are compact in construction and have small headroom and clearance requirements. These hangers are rugged in construction and are easy and economical to assemble and place in use. Advantageously, this invention enables the construction of the lever from two identical side plates utilizing only two direct connections between them as provided by a top spacer and a tublar spacer also serving as a sleeve for the main pivot. The two sides of the mounting frame are held rigidly spaced apart by a shouldered bolt forming the main pivot axis.

Advantageously, the spring-anchoring pivot is substantially higher on the frame than the main pivot, and the spring-arm is elevated above the main pivot for all positions of the lever. This arrangement is advantageous in reducing the over-all height of the constant support hanger.

In the accompanying drawings are shown three illustrative embodiments of the present invention, but it will be understood that the present invention may likewise be embodied in other forms and that numerous constructional features of the spring hanger may be changed in accordance with the requirements of various installations while still remaining within the scope of this invention.

In these drawings:

FIGURE 1 is a view partly in side elevation, partly in section, of a long-travel adjustable spring hanger embodying my invention;

FIGURE 2 is a view of the hanger of FIGURE 1 as seen looking upwardly from along the broken line 2—2, with center portions of the two side frames being seen in section;

FIGURE 3 is an end elevational view of the hanger of FIGURE 1 as seen from the left side of FIGURE 1;

FIGURE 4 is a vertical and sectional view taken along the line 4—4 as generally indicated in FIGURE 1 and looking toward the right;

FIGURE 5 is a partial elevational view of a modified form of the long-travel hanger of FIGURE 1 having a different structure of the load capacity adjustment indicator;

FIGURE 6 is a view partly in side elevation, partly in section of another modified form of the spring hanger of the present invention;

FIGURE 7 is an end elevational and sectional view of the spring hanger of FIGURE 6 taken along the line 7—7 in FIGURE 6 looking toward the right; and FIGURE 8 is a detail perspective view of the load capacity indicator of the hangers of FIGURES 5 and 6.

Referring to the drawings in greater detail, in FIGURES 1–4 is shown a combined frame and housing member 10 having a generally inverted U-shape as seen in end elevation and including a pair of identical side plates 12. These side plates include a rectangular window opening 14 providing access for the load capacity adjustment, as explained further below, and they are welded along their top edges to a horizontal mounting plate 16 forming the top of the housing 10. The side plates 12 in a generally triangular configuration taper inwardly and downwardly from opposite ends of the top plate 16 to a rounded vertex at the lowermost point of the frame.

In order to accommodate load movement, a movable lever, generally indicated at 18, is pivoted on a main pivot bolt 20 (please see FIGURES 3 and 4) which has a center portion of enlarged diameter spanning between the two side plates of the frame. This bolt 20 has threaded end portions of reduced diameter projecting out through holes in the side plates near to and concentric with the rounded vertices of the side plates of the frame. A pair of nuts 22 are screwed onto opposite ends of the main pivot bolt and are tack welded in place, rigidly holding the side plates positioned against the spacing shoulders of the bolt.

Advantageously, the lever 18 is simple in construction and includes a pair of identical elbow-shaped sides 24 welded along their top edges to a rectangular spacer plate 26. A tubular spacer 28 spans between the lower rounded elbow portions of the two sides 24 and projects out through holes slightly beyond the outer surfaces of the two sides of the lever. This tubular spacer has its ends welded to the sides of the lever and encloses two cylindrical sleeve bearings 30 riding on the main pivot axis 20. In this way the sides of the lever are rigidly braced top and bottom, forming a rugged integral unit.

In order to stop the lever 18 and positively to position it in its uppermost position, the top spacer 26 and the upper corners of the lever sides at 32 form a shoulder abutting flush against a first cross brace 34 forming a positioning stop.

A movable load for example, such as piping (not shown) in a high temperature steam line, is supported generally in a position below the hanger with the length of the piping running parallel with the length of the mounting plate 16 in an arrangement such as is well understood in the art. This piping load is supported by a load rod screwed into the lower end of a turnbuckle element 36 which is carried on an eye bolt 38 pivotally mounted on a load pivot pin 40. As seen in FIGURE 3, this load pivot is headed at one end and passes through holes at the ends of arms 42 which extend upwardly at an angle of approximately 30° with respect to the horizontal. A cotter pin 44 holds the load pivot in position.

In order to accommodate slight lateral movements of the supported load, the eye bolt 38 has its opening laterally rounded or flared out so it can roll slightly back or forth, this flaring being indicated by dotted lines in FIGURE 3. A pair of loosely fitting spacing collars 46 surround the load pivot on opposite sides of the eye bolt 38.

When the lever is in its high position as indicated by the full line drawing in FIGURE 1, a line 48 passing from the axis of the load pivot through the axis of the main pivot 20 is at an angle of 30° above the horizontal. When the load pivot 40 swings down to its low position as indicated by the partial phantom-line drawing at 40', a straight line 48' through these two pivots is at the same angle below the horizontal.

In this example, the distance 48 between the load pivot 40 and the main pivot 20, called herein the load arm of the lever, is 12 inches. Thus, it will be appreciated that the maximum vertical travel of the load which this hanger will accommodate (i.e. the vertical distance between the positions at 40 and 40') is a full 12 inches, and the three positions 20, 40, and 40' define an equilateral triangle as shown.

For purposes of supplying a substantially constant supporting force to the load, spring means are used, here being shown for example as outer and inner coaxial compression springs 50 and 52, respectively. Depending upon the magnitude of the supporting force required either one or both may be used. In order to provide three overlapping ranges of load capacity adjustment by using either one or both springs, as explained more fully further below, the outer spring 50 is formed of larger diameter stock and has a stiffness coefficient which is 1.7 times that of the inner spring 52.

This compression spring means is mounted upon a swingable rectangular spring platform 54 having a pair of lugs 56 projecting between the edges of the frame side plates 12. The lugs are pivotally anchored trunnion-fashion by a pair of shoulder screws 58 whose shanks have a loose running fit within holes in the side plates 12, thus forming the spring-anchoring pivot.

At its outer end the spring means thrusts against a cap member 60 secured to a spring rod 62 passing in along the axis of the spring and slidably fitting through a rigid guide tube 64 rigidly secured to the platform 54. The purpose of this rigid tube 64 is to assure that the spring rod 62 remains straight and does not tend to droop at its free end under the cantilevered weight of the free end of the spring. Any tendency for the rod 62 to bind in the tube 64 is prevented, as indicated in FIGURE 1, by making the internal diameter of the tube 64 at least 1/16 of an inch larger than the rod 62. Bearing sleeves 65 are force-fitted into enlarged sockets in both ends of the tube 64 and provide a freely sliding fit around the rod 62. The guide tube extends through a hole in the spring platform and is rigidly welded thereto.

In order to provide the fullest extent of support for the rod 62, the guide tube 64 projects in both directions from the middle of the spring platform and is as long as possible, being just short of a length which would cause interference with the moving parts at either extreme of motion of the lever system. As shown, the guide tube projects inwardly toward the spring arm pivot a distance from the middle of the platform more than one-half of its projection outwardly toward the cap member 60. This inward projection has a length which is more than 60% of the diameter of the outer spring to provide good support for the rod 62.

A clevis member 66 is screwed onto the inner end of the spring rod 62 and is pivotally carried by an adjustable spring arm pivot 68 which is positioned vertically above the main pivot 20 in the high position. This pivot 68 is formed by a headed pin passing through guideways in the lever formed by a pair of elongated slots 70 having their long axes extending radially away from the main pivot 20. A cotter pin 72 passes through the other end of the pin 68.

In order to adjust the load capacity of the hanger, the pivot 68 is slid along the guide 70 by a load capacity adjustment mechanism including an eye bolt 74 whose eye is force-fitted onto the center of the pivot within the fork of the clevis member 66. Thus, the pivot pin 68 cannot rotate with respect to the adjusting bolt 74. The upper end of the adjustment bolt 74 runs up through a hole in the lever top spacer 26 and is held in position by a pair of clamping nuts 76 and 78 tightened against the top and bottom surfaces of the spacer. Convenient access to the nut 76 is provided through the window opening 14. A matching window 80 is formed near the top of the lever 18 along the spacer 26 by a cut out portion of the side 24 providing access to the other clamping nut 78.

For purposes of indicating the load capacity adjustment, a scale plate 82 is riveted to the frame with its scale graduations extending vertically along the edge of the window 14. The scale graduations 84 read "Max," "Nor" and "Min," respectively, indicating an adjustment from 25% above normal load capacity to 25% below this. The distance between the main pivot axis and the axis of the pivot 68 called herein the spring arm, is 3¾ inches when the spring pivot 68 is in the mid-position.

As discussed above, the stiffness coefficient or so-called spring constant of the outer spring 50 is approximately 1.7 times that of the inner spring 52 and thus the following typical values of load capacity in pounds are obtained:

|  | Minus 25% | Normal | Plus 25% |
| --- | --- | --- | --- |
| Inner Spring 52 | 269 | 359 | 449 |
| Outer Spring 50 | 450 | 600 | 750 |
| Both Springs | 718 | 959 | 1,200 |

This represents a continuous load capacity adjustment in three adjacent ranges from 269 pounds up to 1200 pounds, a ratio of 4.5 to 1.

This chart may be more conveniently expressed in universal terms by arbitrarily assigning unity value to the normal adjustment of the inner spring as follows:

| Minus 25% | Normal | Plus 25% |
| --- | --- | --- |
| .75 | 1.0 | 1.25 |
| 1.25 | 1.67 | 2.08 |
| 2.00 | 2.67 | 3.33 |

In order to indicate the load capacity adjustment, an L-shaped indicator pointer 86 is fastened to the headed end of the non-rotatable pivot 68. Its end 88 is bent out closely adjacent to the scale 84. During adjustment when the lever shoulder 32 abuts against the stop 34, the pointer end 88 is aligned squarely behind the scale indications as seen looking in through the window 14.

An arcuate load-position indicating scale 90 is riveted to the frame side 12 concentric with the rounded vertex below the main pivot. A pointer 92 is secured to the lever beneath the main pivot and extends out with its edge flush with and closely adjacent to the graduations 94. A scribed line 96 on its edge co-operates with the graduations 94 for reading load position.

A cross brace 98 between the frame sides 12 has a notch 100 in its lower edge to provide clearance for the top end of the adjusting bolt 74 when it is adjusted toward the "Max" position. The hanger frame is mounted to the overhead beam of a building or other fixed structural member by means of a pair of bolts 102 and 104 near either end of the mounting plate 16.

The dimensions and angular relations shown are advantageous in obtaining the compact size of the hanger in spite of its long-travel and more than 4.3 to 1 range of load capacity adjustment. For example, by arranging the load arm to swing through a 60° arc centered about the horizontal and having the spring pivot 68 directly over the main pivot in the high position, it is seen that the spring pivot swings down to a position 68' aligned with the initial load arm line position 48.

The spring anchoring pivot 58 is spaced six inches from the main pivot and at an angle of 60° from the vertical, as shown in FIGURE 1. In its high position, the axis of the spring rod 62 is inclined downwardly from the horizontal at an angle of 4.5°. When the load is at the low position the spring rod 62 swings up to a line 62' at an angle 9° above the vertical, a total angular motion of only 13.5° and requiring very little headroom. As seen clearly from FIGURE 1, the upper edge of the spring cap 60 when it swings up to its highest position 60' advantageously never rises above the plane of the mounting plate 16. Thus, in many cases the mounting plate 16 can be placed flush up against a ceiling or other overhead structure.

The overall height of the hanger as shown in FIGURE 1 is only 10 inches, and the hanger body is only 4¾ inches wide, less than the diameter of the spring. Also, this structure enables the spring arm pivot pin 68 to be identical with the load arm pin 40.

In the partial elevational view of FIGURE 5 is seen a modified form of the hanger of FIGURE 1 with a capacity adjustment indicator scale 82A and pointer 86A which are identical with that shown in FIGURES 6 and 8. In the remaining figures of the drawings, parts performing functions corresponding with those as illustrated in the hanger of FIGURES 1–4 have reference numbers corresponding therewith. This indicator mechanism has the advantage that it can be read at all positions of the lever 18 and from an eye position either at one side or below the hanger. In order to support the scale 82A, the side 24 of the lever 18 is widened somewhat at 106, and the vertex of the side frame is rounded up to provide a viewing notch at 108.

Except for the changes at 106 and 108 and the provision of the scale and pointer 82A and 86A instead of the scale 82 and pointer 86, the modified form of hanger of FIGURE 5 is identical with that of FIGURES 1–4. The details of connection between the pointer 86A and the spring arm pivot 68 are identical with those of the other modified form of hanger shown in FIGURES 6–8 and embodying the present invention and will be understood from a consideration thereof.

As shown in FIGURE 6, the only difference between the hanger of FIGURE 5 and that of FIGURES 6–8 is the smaller length of the lever at its load arm end and the smaller length of the frame side plates 12. This shorter load arm can be obtained by cutting off the lever 18 of FIGURE 1 along the dash and dotted line 110. Thus, it becomes apparent that the structure of the hanger of FIGURES 1, 5 and 6 readily lends itself to the use of a load arm anywhere within the range of 5 to 12 inches, for accommodating different ranges of load travel. When a longer load arm is used it is desirable to extend the left end of the frame so that the bolt 102 is nearly above the load pivot 40.

The pointer 86A is L-shaped and includes a vertical shank 112 secured to the headed end of the spring pivot 68 by a screw passing through a hole 114. An elongated opening 116 embraces the main pivot 20 and maintains the point 88A closely adjacent to the edge of the scale 82A.

As seen in FIGURE 7, the vertical shank of the pointer 86A runs up along the outside of the lever, but it is fully protected within the housing.

From the foregoing it will be understood that the embodiments of the compact long-travel adjustable constant support hanger of the present invention described above are well suited to provide the advantages set forth, and since many possible embodiments may be made of the various features of this invention and as the apparatus herein described may be varied in various parts, all without departing from the scope of the invention, it is to be understood that all matter hereinbefore set forth or shown in the accompanying drawings is to be interpreted as illustrative and that in certain instances, some of the features of the invention may be used without a corresponding use of other features, all without departing from the scope of the invention.

I claim:

1. A spring support for exerting a constant vertical pull on a load movable upwardly and downwardly within a limited range, comprising a frame, a lever having at least a load arm, a spring arm and a main pivot mounting said lever on said frame, at least one coil spring anchoring means on the frame to which one end of the coil spring is connected, a spring pivot member having its axis parallel with said main pivot and connecting the other end of the coil spring to the spring arm of said lever so as to produce a turning moment about the main pivot, said spring arm having an elongated guide extending longitudinally of the spring arm, said guide extending in a radial direction with respect to the main pivot and being slidingly engaged by said spring pivot member, a load pivot on said load arm having its axis parallel with said main pivot, a connection for the load to said load pivot producing a load turning moment in an angular direction about the main pivot opposed to the direction of the turning moment of said spring means, an eye bolt having its eye positioned around said spring pivot member with its threaded end extending radially away from the main pivot to the end of the spring arm, said spring arm having an end portion with an opening therein, said shank extending through said opening, and screw means adjacent to the end portion of the spring arm engaging said threaded end of the eye bolt for moving said pivot member radially along the guide on said spring arm for adjusting the load capacity of the support, an indicator element having one end secured to said pivot member, said indicator element having a shank extending inwardly along said spring arm to a position adjacent to the main pivot, a pointer on the inner end of said shank adjacent to the main pivot, and a scale mounted on said lever near the main pivot and co-operating with said pointer for indicating load capacity adjustment.

2. A spring support as claimed in claim 1 and wherein said indicator element is L-shaped with one end of the shank being secured to said pivot member and its right-angle bend being closely adjacent to the main pivot, and the other end of said L-shaped indicator element being pointed and adjacent to said scale for indicating the load capacity adjustment.

3. A spring support for exerting a constant vertical pull on a pipe load movable upwardly and downwardly within a limited range and having a reduced headroom requirement, comprising a top mounting plate, a pair of generally parallel sides depending therefrom said mounting plate and sides defining an inverted U-shaped frame, a lever including two spaced parallel elbow-shaped side plates defining a load arm and a spring arm at an angle with respect to each other and each having an opening near the elbow portion, said lever plates having a first brace extending between them at the end of said spring arm, said first brace having an opening therein, a second tubular brace extending between them at their elbow portion and having its ends secured in said openings in the side plates, said tubular brace forming a sleeve bearing, a main pivot extending between said sides of the frame and being journaled in said sleeve bearing, said lever plates defining guides radial with respect to the main pivot, a coil spring having two ends, an anchoring pivot on the frame to which one end of the spring is connected, a spring pivot carried by said spring arm and being movable in position along said spring arm, said spring pivot extending between said side plates and having its axis parallel with the main pivot and connecting the spring to the spring arm of said lever so as to produce a turning moment about the main pivot, the ends of said spring pivot being guided by said guides, load capacity adjustment means for moving said spring pivot along said guides including a threaded rod connected to said spring pivot and extending out through said opening in said first brace, and screw means adjacent to said first brace engaging said threaded rod, and a load pivot on said load arm supporting the load and producing a turning moment opposed to said spring moment.

4. A spring support for exerting a constant vertical pull on a load movable upwardly and downwardly, comprising a frame, a lever system, a main pivot swingably mounting said lever system in said frame, means for connecting the load to be supported to said lever system, a compression coil spring, an anchoring pivot on the frame, a swingable platform carried by said anchoring pivot and supporting one end of said compression spring, said spring platform having an opening therein coaxial with said coil spring, a spring rod connected to the other end of said spring and extending through the opening in said platform and being connected to the lever system to apply a load balancing force, and a rigid guide tube surrounding said spring rod and extending through said opening in the spring platform, said guide tube being secured to said spring platform and supporting a first bearing sleeve engaging said spring rod intermediate said platform and said other end of the spring, said guide tube also extending toward said lever system and supporting a second bearing sleeve engaging said spring rod intermediate said spring platform and the lever system.

5. A support for supporting a load which is movable upwardly and downwardly during changes in operating conditions comprising a frame, a lever including a load arm and a spring arm, a main pivot mounting said lever on said frame for swinging movement about the axis of the main pivot, a coil spring having two ends, anchoring means connected to one end of the coil spring and pivotally mounted on the frame for swinging movement about an axis parallel with the axis of the main pivot, a first pivot member carried by the spring arm and having its axis parallel with the axis of the main pivot, said first pivot member connecting the other end of the coil spring to said spring arm, a second pivot member carried by the load arm and having its axis parallel with the axis of the main pivot for connection to the load, adjusting means for moving one of said pivot members along its arm toward and away from the main pivot for adjusting the load capacity of the support, an indicator element having one end connected to said one pivot member and having a shank portion extending to the main pivot, said shank portion being slotted and straddling the main pivot, an indicator point on said element near the main pivot, and a scale plate mounted on the lever near the main pivot, the plane of said scale plate being perpendicular to the axis of the main pivot, said indicator point being adjacent to said scale plate and moving along said scale plate in accordance with the load capacity adjustment made by said adjusting means.

6. A compact adjustable spring support for supporting a load which is movable upwardly and downwardly during changes in operating conditions comprising a frame having a generally inverted U-shape including a pair of parallel side plates extending down from a top mounting, at least one of said side plates having an access window therein near to the top mounting, a lever including two spaced parallel side members forming a load arm and a spring arm, a brace extending between said side members near the end of said spring arm, main pivot means pivotally supporting said lever between said side plates for swinging movement about a horizontal axis beneath said access window, said load arm swinging over an arc from a high position which is higher in elevation than said axis to a low position which is lower in elevation than said axis, a stop positioned between said side plates and engaging the lever when the load arm is in its high position, said spring arm being above the axis of the main pivot means and adjacent to said access window when said load arm is in its high position, a load pivot extending between the side members of the lever for connection to the load and having its axis parallel to the axis of the main pivot means, each of said side members defining guide means extending radially along the portions of the side members which form the spring arm, a coil spring having two ends, anchoring means connected to one end of the spring and pivotally mounted on said frame side plates for swinging movement about a horizontal axis parallel with the axis of the main pivot means, a spring pivot carried by the spring arm and connecting the other end of the coil spring thereto, and movable in position therealong, said spring pivot having its axis parallel to the axis of the main pivot means, the ends of said spring pivot being guided by said guide means, and adjusting screw means extending radially from said spring pivot to the brace near the end of the spring arm for adjusting the position of the spring pivot along said radial guide means for adjusting the load capacity, said adjusting screw means being accessible through said access window when the lever engages the stop with said spring arm adjacent to the access window.

References Cited in the file of this patent

UNITED STATES PATENTS

| | | |
|---|---|---|
| 210,493 | Brown | Dec. 3, 1878 |
| 1,612,163 | Todd | Dec. 28, 1926 |
| 2,417,114 | Kilham | Mar. 11, 1947 |
| 2,535,305 | Loepsinger | Dec. 26, 1950 |
| 2,709,057 | Gould | May 24, 1955 |
| 2,756,014 | Leibfried | July 24, 1956 |
| 2,784,962 | Sherburne | Mar. 12, 1957 |
| 2,903,213 | Suozzo | Sept. 8, 1959 |